(12) United States Patent
Speidel et al.

(10) Patent No.: US 11,088,409 B2
(45) Date of Patent: Aug. 10, 2021

(54) ENERGY STORE IN AN INSTALLATION HOUSING AND IN A COOLING AIR FLOW

(71) Applicant: ads-tec GmbH, Nürtingen (DE)

(72) Inventors: Thomas Speidel, Markgröningen (DE); Matthias Bohner, Stuttgart (DE)

(73) Assignee: ads-tec Energy GmbH, Nürtingen (DE)

( * ) Notice: Subject to any disclaimer, the term of this patent is extended or adjusted under 35 U.S.C. 154(b) by 212 days.

(21) Appl. No.: 16/306,286

(22) PCT Filed: Jun. 6, 2016

(86) PCT No.: PCT/EP2016/000930
§ 371 (c)(1),
(2) Date: Nov. 30, 2018

(87) PCT Pub. No.: WO2017/211373
PCT Pub. Date: Dec. 14, 2017

(65) Prior Publication Data
US 2019/0131677 A1    May 2, 2019

(51) Int. Cl.
*H01M 10/6566* (2014.01)
*H01M 10/6563* (2014.01)
(Continued)

(52) U.S. Cl.
CPC ..... *H01M 10/6566* (2015.04); *H01M 10/613* (2015.04); *H01M 10/6563* (2015.04); *H01M 50/20* (2021.01)

(58) Field of Classification Search
None
See application file for complete search history.

(56) References Cited

U.S. PATENT DOCUMENTS

| 5,589,290 A | 12/1996 | Klink et al. |
| 2006/0091856 A1 | 5/2006 | Lee et al. |

(Continued)

FOREIGN PATENT DOCUMENTS

| CN | 1790803 | 6/2006 |
| CN | 1905268 | 1/2007 |

(Continued)

*Primary Examiner* — Lucas J. O'Donnell
(74) *Attorney, Agent, or Firm* — Gudrun E. Huckett (57) ABSTRACT

The invention relates to an energy store comprising an arrangement of battery cells (70, 80, 90) in an installation housing (2), wherein groups (I, II, III) of battery cells (70, 80, 90) follow one another in the direction of the longitudinal axis (10) of the installation housing (2). Within each group (I, II, III) of battery cells (70, 80, 90), a flow path (50, 51, 52) for cooling air is formed, which flow path connects a feed air opening (35, 36, 46) for a cooling air flow (5, 6) to a cooling air outlet (20, 21, 23). In order to achieve effective cooling, first feed air openings (35) and a first cooling air outlet (20) are associated with a first flow path (50) in a first group (I) of battery cells (70) and second feed air openings (36) and a second cooling air outlet (21) are associated with a second flow path (51) in a second group (II) of battery cells (80). The cooling air flow (5) of the first flow path (50) is led to the first cooling air outlet (20) separately from the cooling air flow (6) of the second flow path (51) and the cooling air flow (6) of the second flow path (51) is led to the second cooling air outlet (21) separately from the cooling air flow (5) of the first flow path (50).

24 Claims, 8 Drawing Sheets

(51) Int. Cl.
*H01M 10/613* (2014.01)
*H01M 50/20* (2021.01)

(56) References Cited

U.S. PATENT DOCUMENTS

| | | |
|---|---|---|
| 2007/0031728 A1 | 2/2007 | Lee et al. |
| 2008/0026284 A1 | 1/2008 | Fujii |
| 2011/0244295 A1 | 10/2011 | Han et al. |
| 2012/0183822 A1 | 7/2012 | Chung et al. |
| 2013/0017428 A1 | 1/2013 | Han et al. |
| 2013/0230753 A1 | 9/2013 | Jeong et al. |
| 2013/0309532 A1 | 11/2013 | Chung et al. |
| 2016/0093935 A1 | 3/2016 | Obasih et al. |

FOREIGN PATENT DOCUMENTS

| | | |
|---|---|---|
| CN | 1905269 | 1/2007 |
| CN | 102214809 | 10/2011 |
| CN | 102484297 | 5/2012 |
| CN | 103329341 | 9/2013 |
| DE | 198 28 252 | 12/1999 |
| EP | 0 670 607 | 9/1995 |

ENERGY STORE IN AN INSTALLATION HOUSING AND IN A COOLING AIR FLOW

BACKGROUND OF THE INVENTION

The invention concerns an energy store of an arrangement of battery cells in an installation housing. In the direction of the longitudinal axis of the installation housing, groups of battery cells follow each other. Within a group of battery cells, at least one flow path for cooling air is formed which comprises at least one feed air opening for a cooling air flow formed in an inflow side of the installation housing. The cooling air flow flows along the flow path between the battery cells and exits through a cooling air outlet.

Such energy stores are used, for example, as an uninterruptible power supply (UPS) in electronic equipments which are to be operated uninterruptibly independent of the public power supply network.

During discharge as well as during charging, the battery cells arranged in such an energy store release thermal energy which is to be removed regularly by cooling air. Due to the arrangement of several groups of battery cells one after another in longitudinal direction of the installation housing, the battery cells which are directly neighboring the feed air openings are cooled well while the battery cells arranged in the flow path of the cooling air at the end of the installation housing are cooled only moderately due to the already preheated cooling air flow. This can lead to a premature failure of the energy store.

It is the object of the invention to configure an energy store of an arrangement of battery cells in an installation housing in such a way that all battery cells received in the installation housing can be cooled in a fail-safe way.

SUMMARY OF THE INVENTION

The object is solved according to the invention in that first feed air openings and a first cooling air outlet are correlated with a first flow path in a first group of battery cells, in that second feed air openings and a second cooling air outlet are correlated with a second flow path in a second group of battery cells, and in that the cooling air flow of the first flow path is conducted, separated from the cooling air flow of the second flow path, to the first cooling air outlet, and the cooling air flow of the second flow path is conducted, separated from the cooling air flow of the first flow path, to the second cooling air outlet.

A first cooling air outlet is associated with a first flow path of a first group of battery cells. A second cooling air outlet is associated with a second flow path of a second group of battery cells. The cooling air flow of the first flow path is guided, separated from the cooling air flow of the second flow path, to the first cooling air outlet while the cooling air flow of the second flow path is guided, separated from the cooling air flow of the first flow path, to the second cooling air outlet. The first flow path has correlated therewith feed air openings and the second flow path has correlated therewith, preferably separate, feed air openings. In this context, it may be expedient to correlate first feed air openings with the first flow path and second feed air openings with the second flow path. Accordingly, each flow path is supplied with unused fresh cooling air. Since each one of the cooling air flows is discharged through a cooling air outlet correlated with it, it can be avoided that the waste heat of a first group of battery cells impairs the cooling action of a second group of battery cells. A fail-safe cooling action is ensured by several cooling air flows that are separated from each other.

The flow path of the cooling air through a first group of battery cells comprises a first flow resistance; the flow path of the cooling air through a second group of battery cells comprises a second flow resistance. According to the invention, it is provided that the first flow resistance is identical to the second flow resistance. In this way, it is achieved that upon connecting the first cooling air outlet and the second cooling air outlet to a common suction side of a cooling air blower, the air flow rate through the first flow path is the same as through the second flow path.

In particular, it is provided to arrange, in longitudinal direction of the installation housing, several groups of battery cells with flow paths that are separated from each other and to construct the flow resistances of the flow paths of all groups to be identical.

The cooling air flow is expediently generated by a cooling air blower wherein the cooling air outlets are connected together to the suction side of the cooling air blower. In this way, the energy stores can be mounted in a rack (for example, 19" installation housing) wherein the cooling air blower generates a vacuum in the housing space of the rack itself. Due to this identical vacuum which is applied to all cooling air outlets, a uniform cooling action of all groups of battery cells is achieved.

In particular, the cooling air outlet is formed as an outlet opening of the installation housing and extends transversely to the longitudinal direction as an outlet slot across more than half of the width of a housing side.

The flow path of a group of battery cells, in a partial section, is guided to a cooling air outlet transverse to the longitudinal direction of the installation housing. Such a cooling air outlet can be formed, for example, in the bottom of the installation housing.

The flow path of a group of battery cells is formed by at least one cooling air channel wherein the cooling air channels of all groups are positioned aligned in the longitudinal direction of the installation housing. The flow path of a group is expediently formed by several cooling air channels positioned adjacent to each other in this group of battery cells.

Between the groups of battery cells which are positioned one after another in longitudinal direction of the installation housing, an intermediate space is formed respectively. A partition wall guiding cooling air is arranged between neighboring groups of battery cells. The partition wall is provided such that it separates incoming cool feed air and outflowing heated waste air.

In a particular further embodiment of the invention, it is provided that the flow path of a group opens into a collecting space that is connected to at least one cooling air outlet. Expediently, the collecting space is delimited by the partition wall.

In a further embodiment of the invention, it is provided to arrange, following the first group of battery cells in longitudinal direction of the installation housing, at least the second group of battery cells with a second flow path. The second group of battery cells has correlated therewith a feed air channel wherein the feed air channel of the second flow path connects the feed air opening for a cooling air flow to a feed air space positioned between the groups.

In a further embodiment of the invention, following the second group of battery cells in longitudinal direction of the installation housing, at least one further group of battery cells with a further flow path is provided, wherein the further group of battery cells has correlated therewith a further feed air channel. The further feed air channel connects upstream of the further flow path the feed air opening for a cooling air flow to a feed air space positioned between the groups.

It can be expedient to design the cross section of the feed air channel in longitudinal direction of the installation housing to decrease from the feed air opening in the inflow side in the direction toward the back wall of the installation housing. Advantageously, the configuration is configured such that the height of the feed air channel decreases.

BRIEF DESCRIPTION OF THE DRAWINGS

Further features of the invention result from the further claims, the description, and the drawing in which an embodiment of the invention explained in the following in detail is illustrated. The features and advantages provided in regard to the individual Figures are mentioned as examples; the features and advantages can be applied to and/or combined with each other in all illustrated Figures.

It is shown in.

DESCRIPTION OF PREFERRED EMBODIMENTS

In the illustrated embodiment, an energy store 1 is illustrated in an installation housing 2. The installation housing comprises a front side 3 which is embodied as inflow side 4 for the cooling air flows 5, 6.

Figure 2:
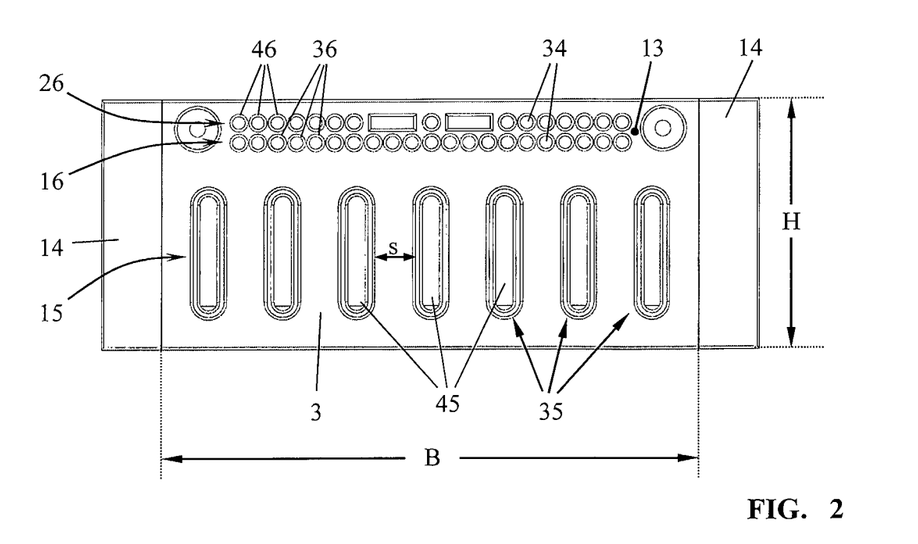
FIG. 2 a front view of the inflow side of the installation housing according to FIG. 1.

As shown in FIG. 2, rows 15, 16, 26 of inflow openings 35, 36, 46 are provided in the front side 3.

The inflow openings 35 of the row 15 are designed as slots 45 which extend across approximately 50% of the height H of the front side 3. Across the width B of the front side several slots 45 are provided as inflow openings 35, wherein neighboring slots 45 are positioned at a spacing s relative to each other.

In a top region 13 of the front side 3, further inflow openings 36, 46 are provided which are designed as rows of holes. The inflow openings 36, 46 configured as circular opening 34 are positioned tightly adjacent to each other wherein the rows of holes extend across approximately two thirds of the width B of the front side 3.

The installation housing 2 comprises a topside 8 (FIG. 1) and a bottom 9. The installation housing 2 extends in the direction of a longitudinal axis 10 of the installation housing 2 from the front side 3 to a back wall 7 in a longitudinal direction 100.

Figure 3:
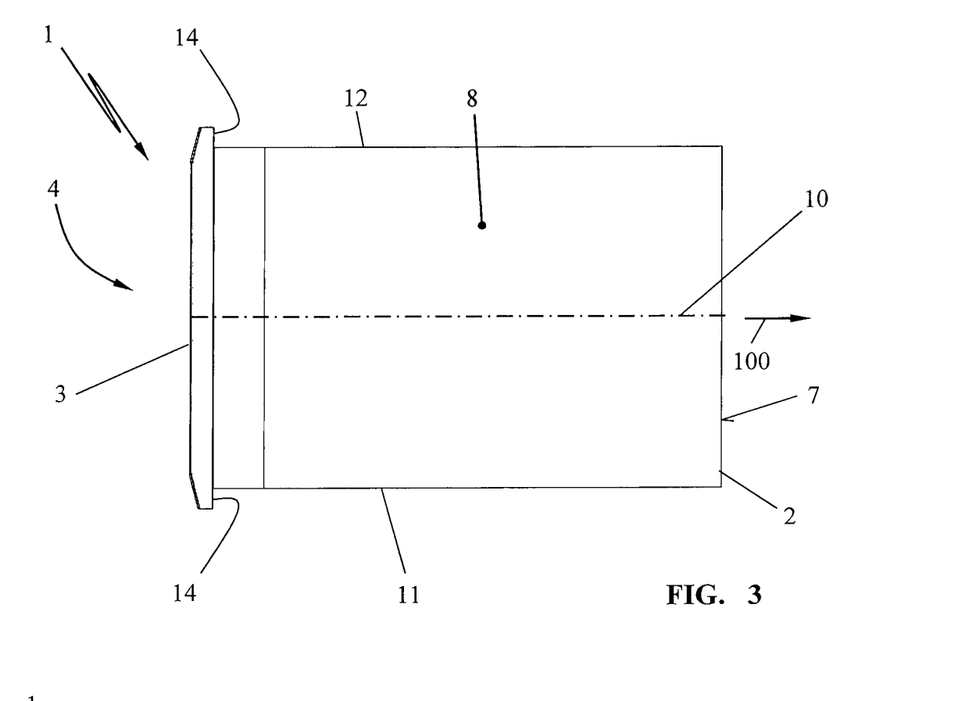
FIG. 3 a plan view of the installation housing from above.

As shown in FIG. 3, the front side 3 projects laterally past the longitudinal sides 11, 12 of the installation housing 2. The projecting rim 14 serves for mounting the energy store in the receiving cabinet, for example, in a 19" rack.

As shown in FIG. 3, the topside 8 of the installation housing 2 is closed; in the bottom side, the bottom 9 of the installation housing 2, cooling air outlets 20, 21 are formed through which cooling air flows out. The cooling air outlets 20, 21 are provided as outlet openings of the installation housing 2, preferably as outlet slots 22 with a length L that corresponds to approximately 80% to 90% of the width EB of the installation housing 2. The width T of an outlet slot 22 corresponds to approximately 3% to 8%, in particular 6%, of the length EL of the installation housing 2.

Figure 1:
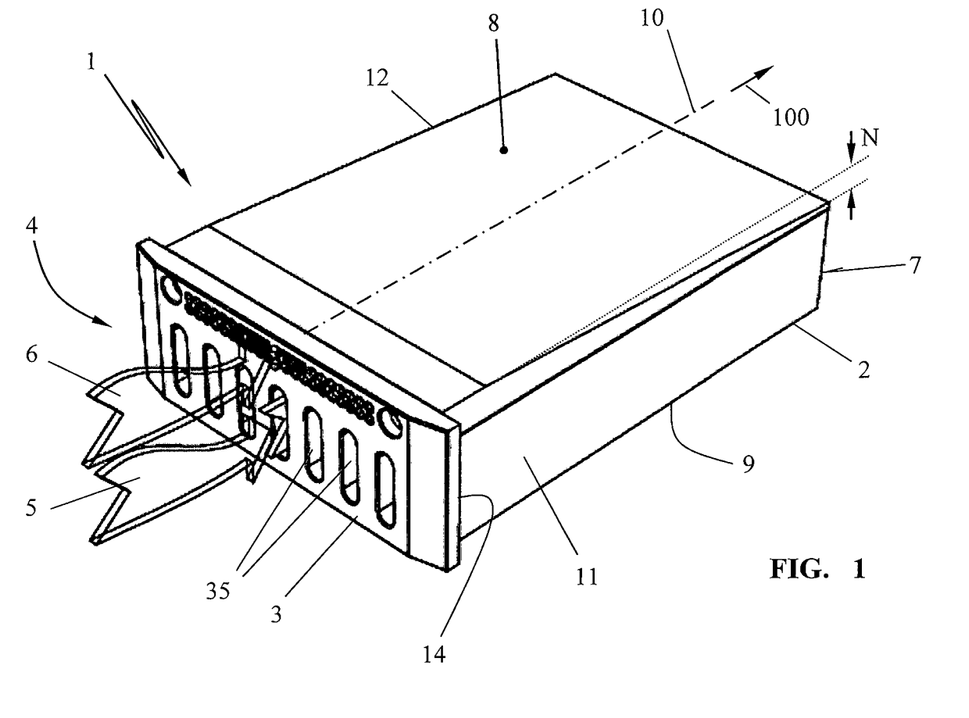
FIG. 1 an isometric view of an energy store in an installation housing.
Figure 5:
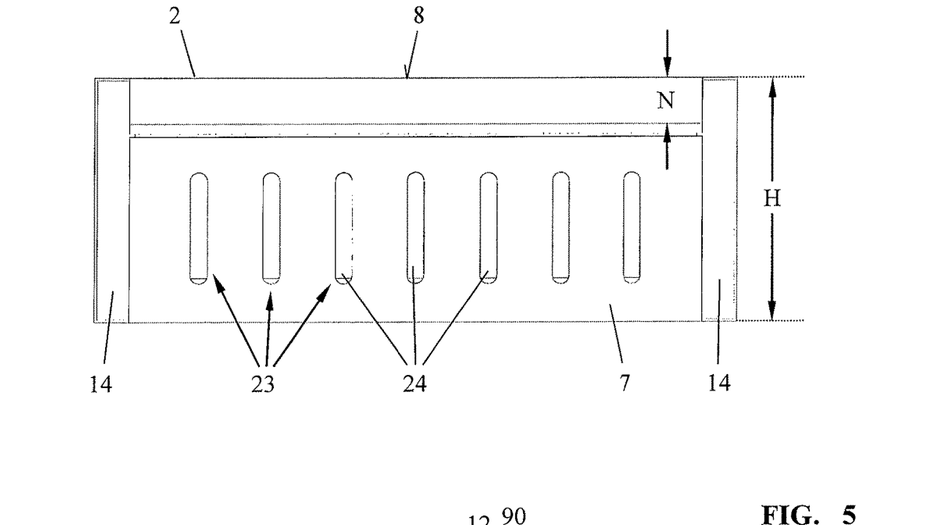
FIG. 5 a view of the back wall of the installation housing according to FIG. 1.

As can be taken from the illustration of FIGS. 1 and 5, the topside 8 of the installation housing 2 slopes downward from the front side 3 toward the back wall 7 in the direction of the longitudinal axis 10. The height decrease N amounts to approximately 15% to 20% of the height H of the installation housing 2. The height H of the installation housing 2 corresponds to the height H of the front side 3.

Figure 6:
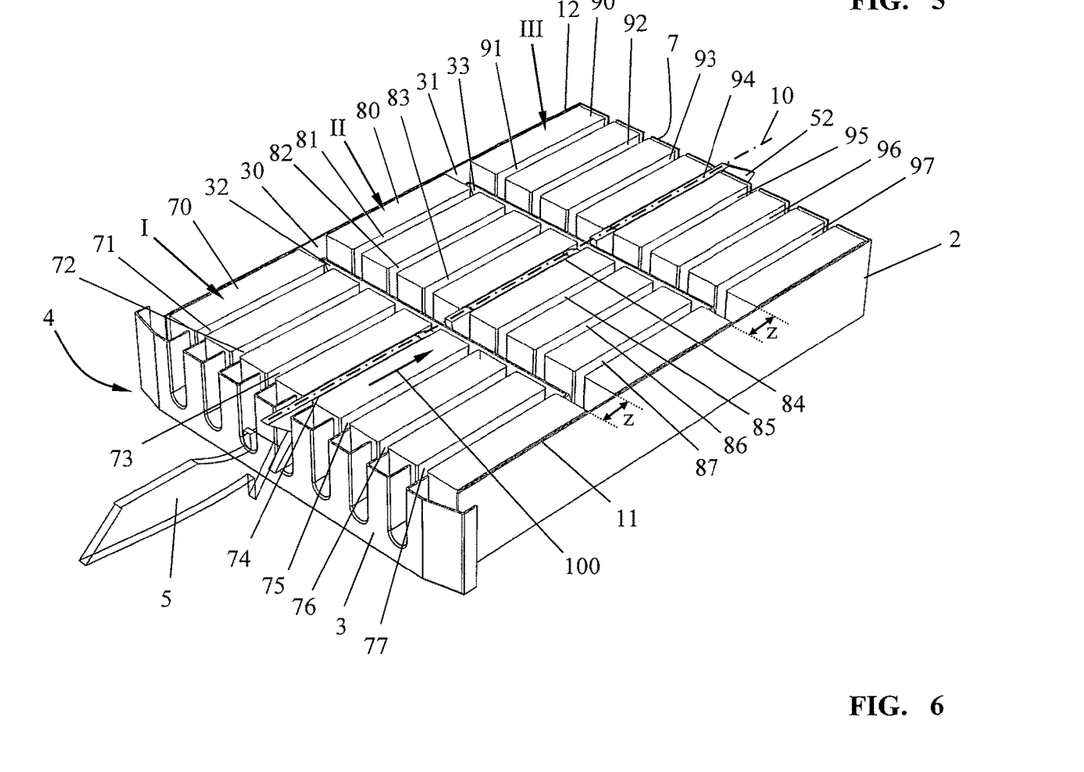
FIG. 6 a horizontal section view of the energy store according to FIG. 1.
Figure 7:
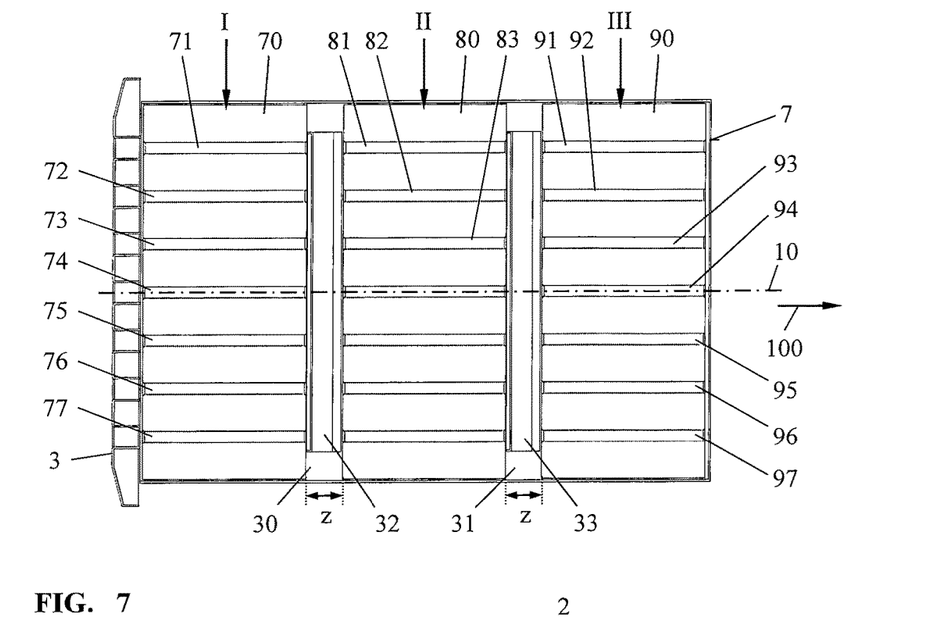
FIG. 7 a plan view of the section view according to FIG. 6.

As shown in FIGS. 6 and 7, battery cells 70, 80, and 90 are arranged in the installation housing 2. The battery cells 70 form a first group I and, as shown in FIGS. 6 and 7, are positioned immediately behind the front side 3 of the installation housing 2. Between two battery cells 70, respectively, cooling channels 71, 72, 73, 74, 75, 76, 77 are provided which are positioned aligned in longitudinal direction 100, i.e., in the direction of the longitudinal axis 10.

The cooling channels 71, 72, 73, 74, 75, 76, 77 are positioned preferably congruently to the inflow openings 35 for cooling air; in FIG. 6, it is represented in an exemplary fashion how the cooling air flow 5 enters the cooling channel 74 in the direction of the longitudinal axis 10.

In the direction of the longitudinal axis 10, i.e., in longitudinal direction 100 of the installation housing 2, a second group II of battery cells 80 is positioned at a spacing z. Between the battery cells 80, in analogy to the configuration between the battery cells 70 of group I, cooling channels 81, 82, 83, 84, 85, 86, 87 are formed. The cooling channels 81, 82, 83, 84, 85, 86, 87 are aligned in longitudinal direction 100 of the installation housing 2.

A third group III of battery cells 90, between which in a corresponding manner cooling channels 91, 92, 93, 94, 95, 96, 97 are formed, follows the second group II of battery cells 80 at a spacing z. The cooling channels 91, 92, 93, 94, 95, 96, 97 of the battery cells 90 of the group III are aligned in longitudinal direction 100 relative to the longitudinal axis 10 of the installation housing 2.

Figure 11:
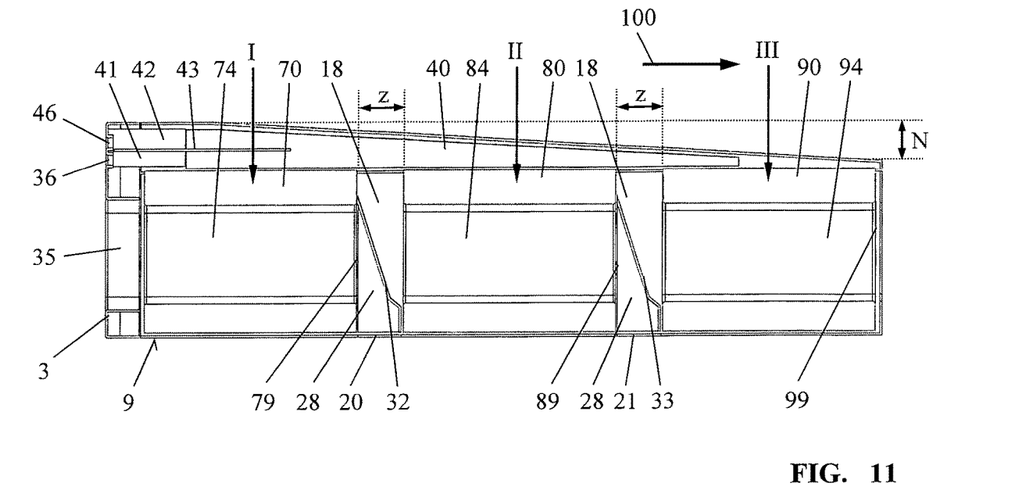
FIG. 11 a longitudinal section through the energy store arranged in an installation housing.
Figure 12:
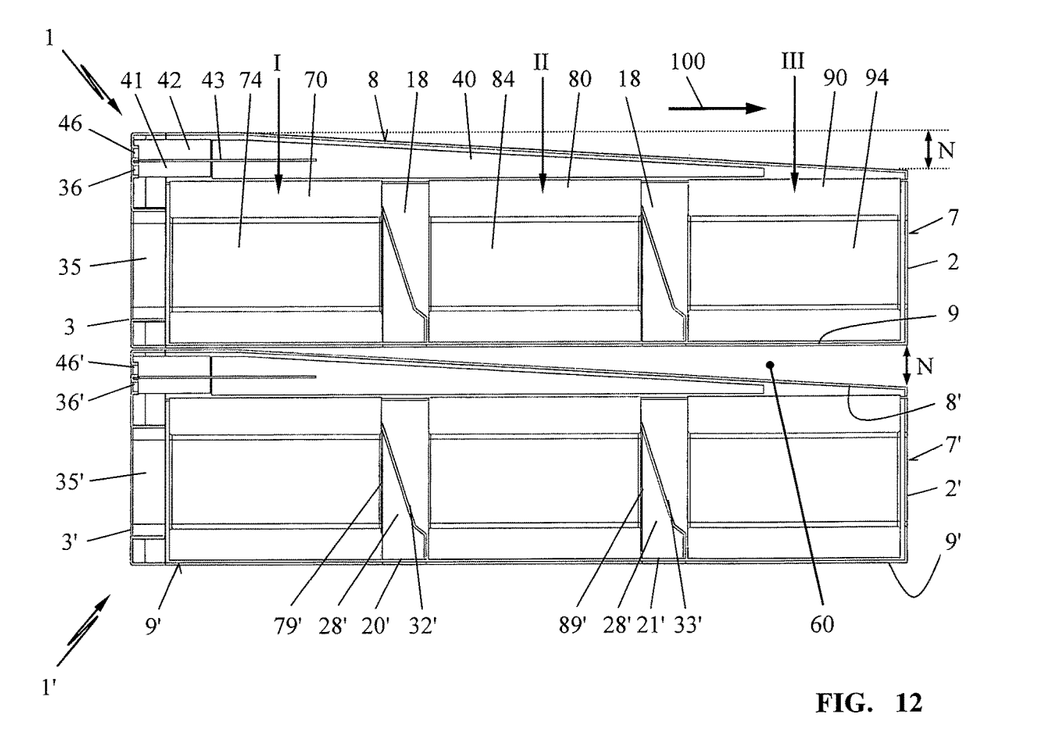
FIG. 12 a section of an arrangement of several energy stores according to FIG. 1.
Figure 13:
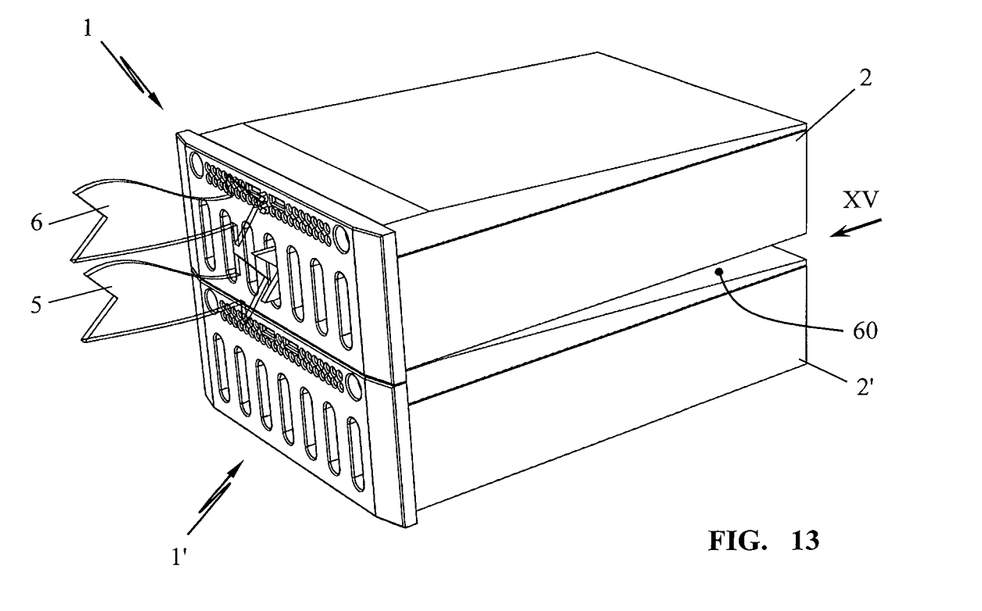
FIG. 13 an isometric view of the arrangement of several energy stores according to FIG. 1.
Figure 14:
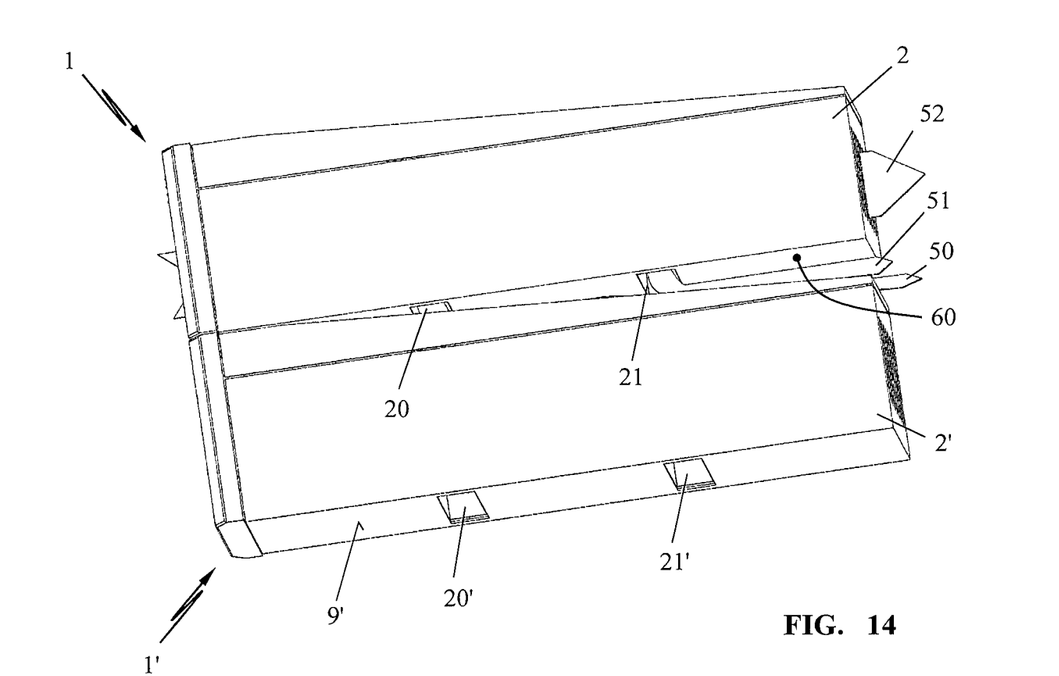
FIG. 14 an isometric side view of the arrangement of energy stores according to FIG. 13.
Figure 15:
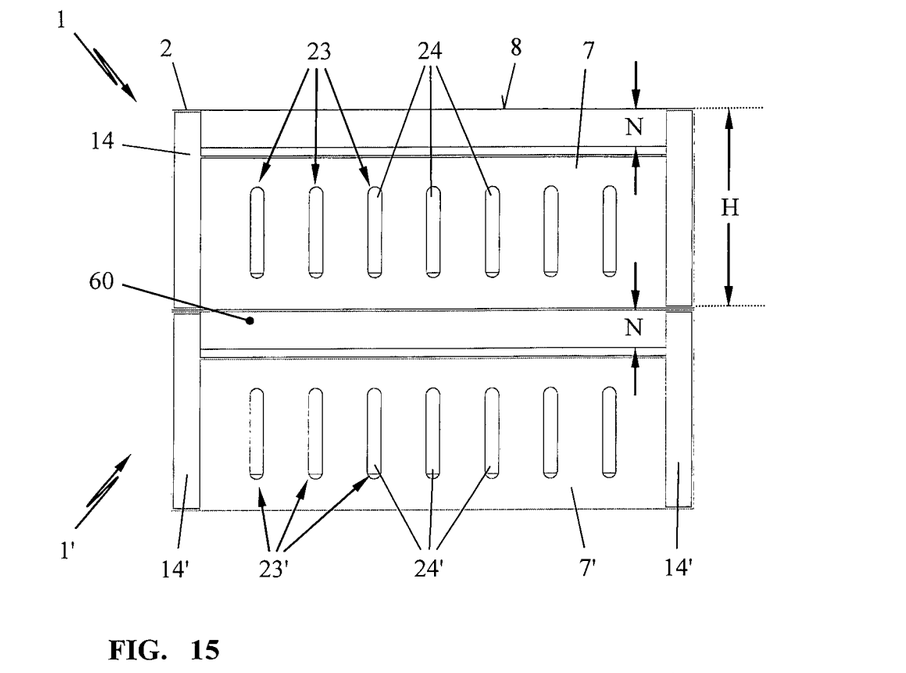
FIG. 15 a view of the back wall of the energy stores according to arrow XV in FIG. 13.
Figure 16:
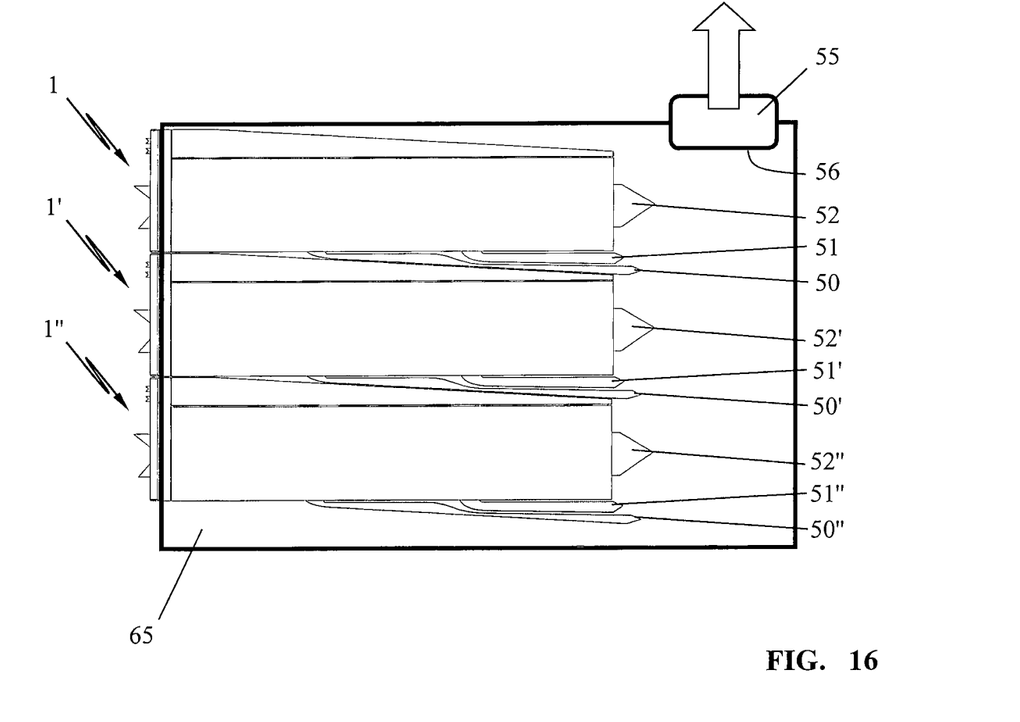
FIG. 16 an arrangement of several energy stores according to FIG. 1 arranged in a receiving cabinet.

As shown in FIGS. 6 and 7, the cooling air channels 71, 72, 73, 74, 75, 76, 77 of the group I are aligned in longitudinal direction 100 relative to the cooling air channels 81, 82, 83, 84, 85, 86, 87 of the group II and the cooling channels 91, 92, 93, 94, 95, 96, 97 of the group III. Between the group I and the group II, the battery cells 70 and 80 have the spacing z; in the same manner, the group II of the battery cells 80 has the spacing z relative to the neighboring group III of the battery cells 90. Due to the spacings z between the groups I, II, and III in the longitudinal direction 100, an intermediate space 30, 31 is formed, respectively. In the intermediate space 30, 31, a partition wall 32, 33 is provided, respectively, which divides the intermediate space 30, 31 into a waste air-conducting collecting space 28 and a feed air-conducting feed air space 18. This can be taken in particular from the illustrations of FIGS. 8, 9, and 11.

Figure 4:
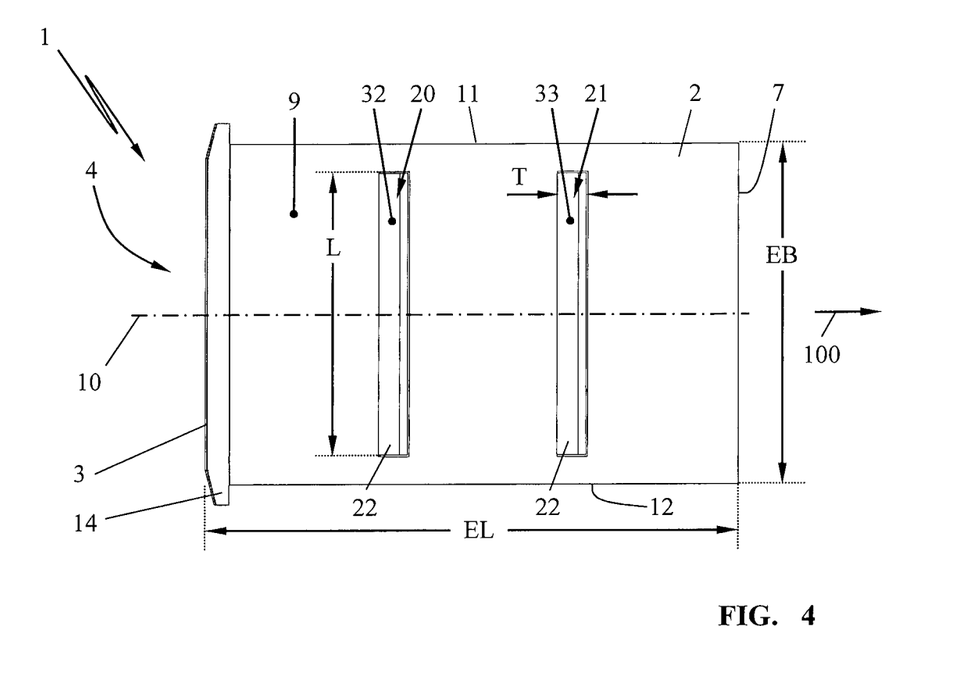
FIG. 4 a plan view of the bottom of the installation housing.

The partition wall 32, 33 formed of a partition plate separates the cooling air channels 71, 72, 73, 74, 75, 76, 77; 81, 82, 83, 84, 85, 86, 87; and 91, 92, 93, 94, 95, 96, 97 of the groups I, II, and III according to groups from each other. Thus, the partition wall 32 covers the end 79 of all cooling channels 71, 72, 73, 74, 75, 76, 77 of the group I so that all channel ends 79 open into the collecting space 28. The partition plate 32 between the group I and the group II in intermediate space 30 covers the outlet opening 20 that is illustrated in FIG. 4. The cooling air which is exiting into the collecting space 28 of the intermediate space 30 can exit the installation housing 2 via the cooling air outlet 20.

Figure 8:
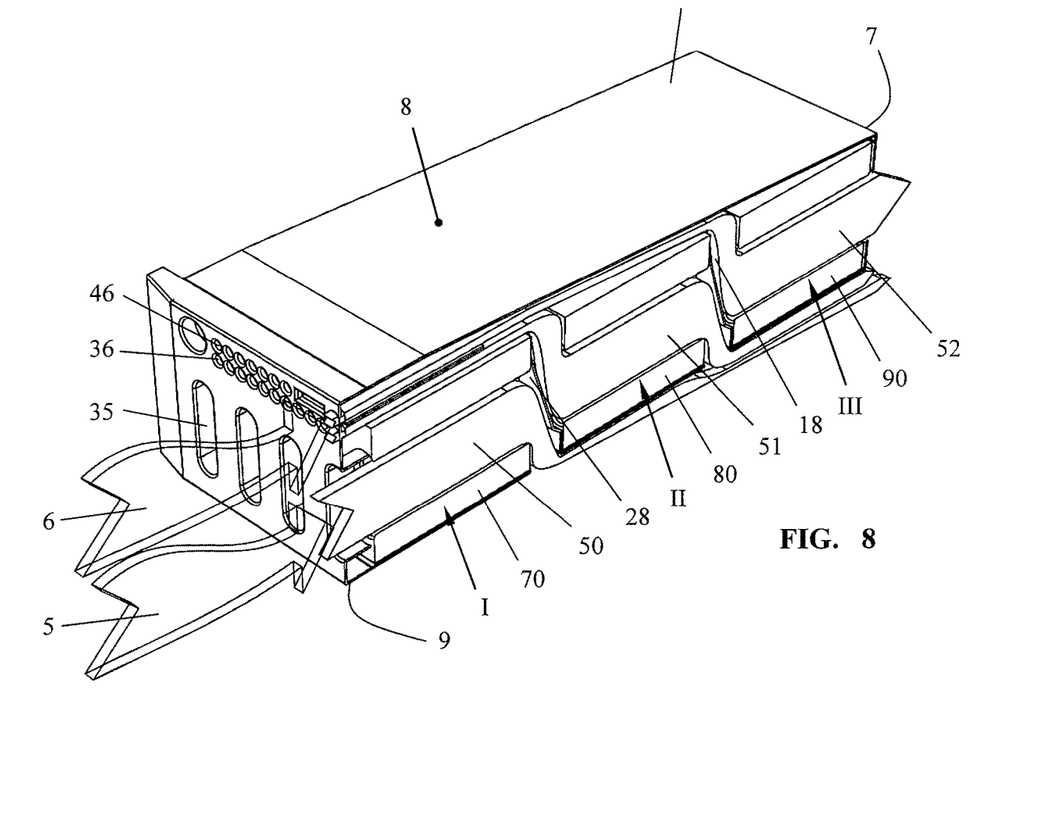
FIG. 8 an isometric illustration of the energy store with an installation housing sectioned in the longitudinal direction.
Figure 9:
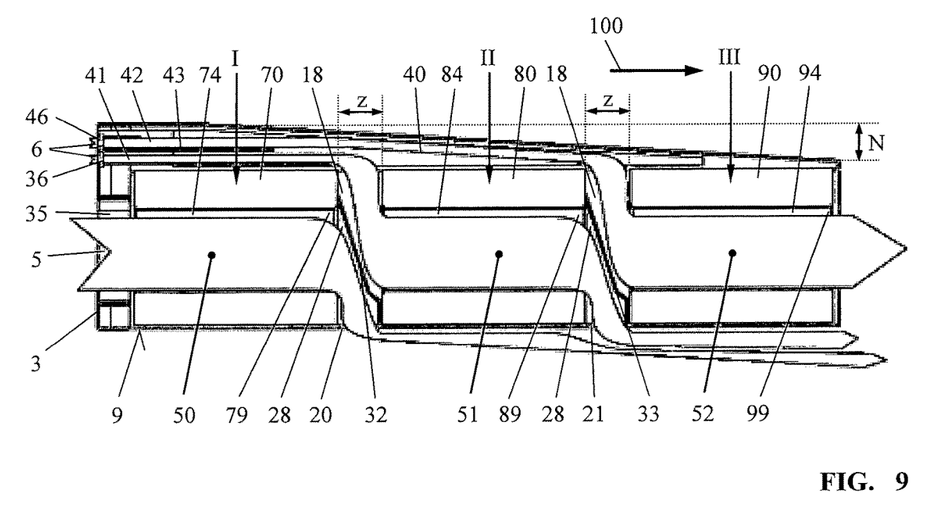
FIG. 9 a side view of the section illustration according to FIG. 8.
Figure 10:
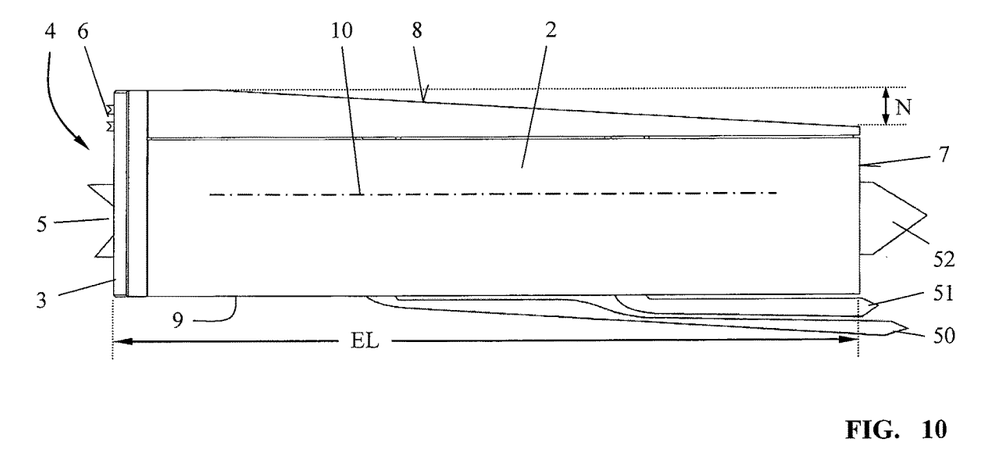
FIG. 10 a side view of the energy store in an installation housing according to FIG. 1.

As illustrated in FIGS. 8 and 9, through the inflow openings 35 at least one cooling air flow 5 flows into a cooling air channel 74 which is formed between the battery cells 70, flows through the channel 74 to the channel end 79 (FIG. 9), exits into the collecting space 28, and flows via the cooling air outlet 20 out of the installation housing 2. The first flow path 50 is formed by the feed air opening 35, the cooling air channel 74 between the battery cells 70 of the group I, the collecting space 28, and the cooling air outlet 20.

A second flow path 51 is formed by a feed air opening 36 at the inflow side 4 of the installation housing 2, a feed air channel 41 which connects the feed air opening 36 to the feed air space 18 in the first intermediate space 30, the cooling channel 84 formed between the battery cells 80 of the second group II whose end 89 opens into the collecting space 28 of the second intermediate space 31, wherein the collecting space 28 of the intermediate space 31 provides an exit through the cooling air outlet 21.

A third flow path 52 is formed by the feed air opening 46 and the feed air channel 42 which connects the feed air opening 46 to the air space 18 in the second intermediate space 31. Through the cooling air channel 94 between the battery cells 90 of the group III, the flow path 52 extends to the outlet openings in the back wall 7 of the installation housing 2. The cooling air outlet 23 is formed of several slots 24 in accordance with the configurations of the feed air openings 35 in the front side 3 of the installation housing 2.

The channel end 99 of the cooling channel 94 is positioned congruently to the outlet slots 24 of the outlet opening 23 so that an immediate outflow of the cooling air along the flow path 52 is ensured.

The feed air channel 41 and the feed air channel 42 of the feed air openings 36 and 46 are separated from each other next to the feed air side 4 by an intermediate wall 43. In this way, it is ensured that the flow paths 51 and 52 of the cooling air can form initially without impairing each other. Expediently, the feed air channels 41 and 42 are joined to a common channel 40 in longitudinal direction 100. The cross section of the common feed air channel 40 decreases preferably in longitudinal direction 100 of the installation housing 2 from the feed air opening 36, 46 in the inflow side 4 in the direction toward the back wall 7 of the installation housing 2. In this way, it is ensured that the cooling air that is flowing in in the longitudinal direction 100 is displaced in the flow path 52 in direction toward the air space 18 of the intermediate space 31, wherein the flow resistance of the flow path 52 can be embodied appropriately adjusted.

In the illustrated embodiment, the first flow path 50 in a first group I of battery cells 70 has associated therewith the first cooling air outlet 20. The second flow path 51 of a second group II of battery cells 80 has associated therewith the second cooling air outlet 21. The flow paths 50, 51 are configured such that the cooling air flow 5 of the first flow path 50 is conducted, separated from the cooling air flow 6 of the second flow path 51, to the first cooling air outlet 20. The cooling air flow 6 of the second flow path 51 is conducted, separated from the cooling air flow 5 of the first flow path 50, to the second cooling air outlet 21.

The flow path 50 of the cooling air through the first group I of battery cells 70 comprises a first flow resistance. The flow path 51 of the cooling air through the second group II of battery cells 80 comprises a second flow resistance. The configuration of the flow paths 50, 51 is provided in this context such that the first flow resistance of the first flow path 50 is identically embodied to the second flow resistance of the second flow path 51. In particular, the configuration of the flow paths 50, 51, 52 is provided such that all groups I, II, III of battery cells 70, 80, 90 positioned in longitudinal direction 100 of the installation housing 2 one after another have flow paths 50, 51, 52 that are separated from each other and the flow resistances of all flow paths 50, 51, 52 of all groups I, II, III are identical.

In the illustrations of FIGS. 8 to 11, the flow paths 50, 51, 52 are shown in an exemplary fashion. The flow path 50, 51, 52 of a group I, II, III of battery cells 70, 80, 90 is respectively formed by several adjacently positioned cooling air channels 71, 72, 73, 74, 75, 76, 77; 81, 82, 83, 84, 85, 86, 87; 91, 92, 93, 94, 95, 96, 97 in the respective group I, II, III of battery cells 70, 80, 90.

The flow paths 50, 51 are designed such that the cooling air is guided transverse to the longitudinal direction 100 of the installation housing 2 to the respective cooling air outlet 20, 21 in the bottom 9 of the installation housing 2.

In FIGS. 12 to 16, two and more energy stores 1, 1', 1" are arranged atop each other. As can be seen in particular in FIGS. 12 to 15, the topside 8 of the installation housing 2 which slopes downward in regard to height has a special importance. When two energy stores 1, 1' or 1" (FIG. 16) are arranged atop each other, between the bottom 9 of the installation housing 2 of one energy store 1 and the topside 8' of the installation housing 2' of the further energy store 1', a waste air space 60 is formed which widens in the flow direction of the flow paths 50, 51. The widened portion corresponds to the height decrease N of the topside 8 of an installation housing 2, 2'.

In a special configuration of the invention, a cooling air blower 55 is provided which sucks in cooling air through the flow paths 50, 51, 52. The incoming cooling air flows 5 and 6 at the inflow side 4 are generated thus by the cooling blower 55 wherein each cooling air outlet 20, 21, 23 is connected to the suction side 56 of the cooling air blower 55. Due to the special configuration of the flow paths 50, 51, 52 and the configuration with approximately identical flow resistance, it is achieved that all groups I, II, III of battery cells 70, 80, 90 are uniformly cooled. The waste heat of a first group I of battery cells 70 therefore does not interfere with the effective cooling action of the groups II, III of battery cells 80, 90 which are downstream in flow direction.

The cooling air blower 55 can be provided in a device cabinet 65, for example, in a 19" rack. The cooling air blower 55 sucks in the air from the device cabinet so that the air is flowing in through the front sides of the energy stores 1, 1', 1".

What is claimed is:

1. An energy store comprising:
   an installation housing comprising a longitudinal axis and further comprising an inflow side facing in a longitudinal direction of the longitudinal axis;
   a plurality of groups of battery cells arranged in the installation housing, wherein the plurality of groups of battery cells comprises a first group of first battery cells, a second group of second battery cells, and a third group of third battery cells, wherein the first group of first battery cells, the second group of second battery cells, and the third group of third battery cells are arranged one after another in the longitudinal direction of the longitudinal axis of the installation housing;
   a first flow path for cooling air formed within the first group of first battery cells;
   a second flow path for cooling air formed within the second group of second battery cells;
   a third flow path for cooling air formed within the third group of third battery cells;
   first feed air openings formed at the inflow side of the installation housing and associated with the first flow path;
   second feed air openings formed at the inflow side of the installation housing and associated with the second flow path;
   third feed air openings formed at the inflow side of the installation housing and associated with the third flow path;
   wherein a first cooling air flow flows from the first feed air openings along the first flow path between the first battery cells and exits through a first cooling air outlet arranged at an exterior of the installation housing;
   wherein a second cooling air flow flows from the second feed air openings along the second flow path between the second battery cells and exits through a second cooling air outlet arranged at the exterior of the installation housing;
   wherein a third cooling air flow flows from the third feed air openings along the third flow path between the third battery cells and exits through a third cooling air outlet arranged at the exterior of the installation housing;
   wherein the first cooling air flow flowing along the first flow path is conducted, separated from the second cooling air flow of the second flow path and separated from the third cooling air flow of the third flow path, to the first cooling air outlet, wherein the second cooling air flow flowing along the second flow path is conducted, separated from the first cooling air flow of the first flow path and separated from the third cooling air flow of the third flow path, to the second cooling air outlet, and wherein the third cooling air flow flowing along the third flow path is conducted, separated from the first cooling air flow of the first flow path and separated from the second cooling air flow of the second flow path, to the third cooling air outlet.

2. The energy store according to claim 1, wherein the first flow path comprises a first flow resistance and the second flow path comprises a second flow resistance, wherein the first flow resistance is identical to the second flow resistance.

3. The energy store according to claim 2, wherein the first, second, and third flow paths are arranged in the longitudinal direction of the installation housing, wherein the third flow path comprises a third flow resistance, wherein the first, second, and third flow resistances are identical among each other.

4. The energy store according to claim 3, wherein the first, second, and third cooling air flows are generated by a cooling air blower, wherein the first, second, and third cooling air outlets are connected to a suction side of the cooling air blower.

5. The energy store according to claim 4, wherein the first and second cooling air outlets are embodied as outlet openings of the installation housing and extend transversely to the longitudinal direction as outlet slots across more than half of a width of the installation housing.

6. The energy store according to claim 3, wherein the first, second, and third flow paths each are formed by a cooling air channel and the cooling air channels are aligned in the longitudinal direction of the installation housing.

7. The energy store according to claim 3, wherein the first flow path is formed of one or a plurality of first cooling air channels, wherein the second flow path is formed of one or a plurality of second cooling air channels, and wherein the third flow path is formed of one or a plurality of third cooling air channels, wherein the first, second, and third cooling air channels are aligned in the longitudinal direction of the installation housing.

8. The energy store according to claim 7, wherein the plurality of first cooling air channels are positioned adjacent to each other, wherein the plurality of second cooling air channels are positioned adjacent to each other, and wherein the plurality of third cooling air channels are positioned adjacent to each other.

9. The energy store according to claim 3, wherein between the first group of first battery cells and the second group of second battery cells a first intermediate space is formed and wherein between the second group of battery cells and the at least one third group of third battery cells a second intermediate space is formed, the energy store further comprising a first partition wall arranged in the first intermediate space and a second partition wall arranged in the second intermediate space, wherein the first and second partition walls are configured to conduct the cooling air.

10. The energy store according to claim 9, wherein the first and second partition walls separate incoming cool feed air and outflowing heated waste air from each other, respectively.

11. The energy store according to claim 1, wherein the first and second cooling air flows are generated by a cooling air blower, wherein the first and second cooling air outlets are connected to a suction side of the cooling air blower.

12. The energy store according to claim 11, wherein the first and second cooling air outlets are embodied as outlet openings of the installation housing and extend transversely to the longitudinal direction as outlet slots across more than half of a width of the installation housing.

13. The energy store according to claim 1, wherein the first and second flow paths are conducted transversely to the longitudinal direction of the installation housing to the first and second cooling air outlets.

14. The energy store according to claim 1, wherein the first flow path is formed of one or a plurality of first cooling air channels and the second flow path is formed of one or a plurality of second cooling air channels, wherein the first and second cooling air channels are aligned in the longitudinal direction of the installation housing.

15. The energy store according to claim 14, wherein the plurality of first cooling air channels are positioned adjacent to each other and the plurality of second cooling air channels are positioned adjacent to each other.

16. An energy store comprising:
   an installation housing comprising a longitudinal axis and further comprising an inflow side facing in a longitudinal direction of the longitudinal axis;
   a plurality of groups of battery cells arranged in the installation housing, wherein the plurality of groups of battery cells comprises a first group of first battery cells and a second group of second battery cells, wherein the first group of first battery cells and the second group of second battery cells are arranged one after another in the longitudinal direction of the longitudinal axis of the installation housing;
   a first flow path for cooling air formed within the first group of first battery cells;
   a second flow path for cooling air formed within the second group of second battery cells;
   first feed air openings formed at the inflow side of the installation housing and associated with the first flow path;
   second feed air openings formed at the inflow side of the installation housing and associated with the second flow path;
   wherein a first cooling air flow flows from the first feed air openings along the first flow path between the first battery cells and exits through a first cooling air outlet of the installation housing;
   wherein a second cooling air flow flows from the second feed air openings along the second flow path between the second battery cells and exits through a second cooling air outlet of the installation housing;
   wherein the first cooling air flow flowing along the first flow path is conducted, separated from the second cooling air flow of the second flow path, to the first cooling air outlet, and wherein the second cooling air flow flowing along the second flow path is conducted, separated from the first cooling air flow of the first flow path, to the second cooling air outlet;
   wherein between the first group of first battery cells and the second group of second battery cells an intermediate space is formed, the energy store further comprising a partition wall arranged in the intermediate space and configured to conduct the cooling air, wherein the partition wall separates outflowing heated waste air of the first cooling air flow flowing along the first flow path from incoming cool feed air of the second cooling air flow flowing along the second flow path.

17. The energy store according to claim 16, wherein the partition wall comprises a first flat side and a second flat side, wherein the first flat side and the second flat side face in opposite directions of the longitudinal axis of the installation housing, wherein the outflowing heated waste air of the first cooling air flow flows along the first flat side and the incoming cool feed air of the second cooling air flow flows along the second flat side.

18. The energy store according to claim 1, wherein the first flow path opens into a first collecting space connected to the first cooling air outlet and wherein the second flow path opens into a second collecting space connected to the second cooling air outlet.

19. The energy store according to claim 1, wherein, in the longitudinal direction of the installation housing, the second group of second battery cells follows the first group of first battery cells, wherein the second group of second battery cells has correlated therewith a first feed air channel connecting, upstream of the second flow path, the second feed air openings to a first feed air space positioned between the first group of first battery cells and the second group of second battery cells.

20. The energy store according to claim 19, wherein, in the longitudinal direction of the installation housing, at least one third group of third battery cells with a third flow path follows the second group of second battery cells, wherein the at least one third group of third battery cells has correlated therewith a second feed air channel connecting, upstream of the third flow path, a third feed air opening for cooling air at the inflow side to a second feed air space positioned between the second group of second battery cells and the at least one third group of third battery cells.

21. The energy store according to claim 20, wherein the first and second feed air channels are joined to a common feed air channel and a cross section of the common feed air channel in the longitudinal direction of the installation housing decreases in the longitudinal direction from the second and third feed air openings at the inflow side toward an opposite back wall of the installation housing.

22. The energy store according to claim 21, wherein a height of the common feed air channel decreases.

23. An energy store comprising:
   an installation housing extending lengthwise along a longitudinal axis, wherein the installation housing comprises a bottom extending parallel to the longitudinal axis and further comprises an inflow side extending transversely to the longitudinal axis, wherein the bottom and the inflow side delimit the installation housing outwardly;
   a first group of first battery cells and a second group of second battery cells arranged in the installation housing one after another in a longitudinal direction of the longitudinal axis of the installation housing;
   a first flow path for a first cooling air flow extending within the first group of first battery cells;
   a second flow path for a second cooling air flow extending within the second group of second battery cells;
   a first feed air opening formed at the inflow side of the installation housing for the first cooling air flow;
   a second feed air opening formed at the inflow side of the installation housing for the second cooling air flow;
   a first cooling air outlet for the first cooling air flow flowing along the first flow path;
   a second cooling air outlet for the second cooling air flow flowing along the second flow path;
   wherein the first cooling air flow flows through the first feed air opening along the first flow path between the first battery cells to the first cooling air outlet;
   wherein the second cooling air flow flows through the second feed air opening along the second flow path between the second battery cells to the second cooling air outlet;
   wherein the first cooling air flow flowing along the first flow path and the second cooling air flow flowing along the second flow path are conducted completely separated from each other through the installation housing;
   wherein the first cooling air outlet is arranged at the bottom of the installation housing;
   wherein the first cooling air outlet is arranged immediately behind the first group of first battery cells, viewed from the inflow side in the longitudinal direction, so that cooling air of the first cooling air flow exits the installation housing through the first cooling air outlet at the bottom after flowing past the first battery cells without flowing past the second battery cells.

24. The energy store according to claim 23, wherein the first cooling air outlet is arranged between the first group of first battery cells and the second group of second battery cells, viewed from the inflow side in the longitudinal direction.

* * * * *